3,051,579
METHOD OF CURING MEAT
Paul A. Hammes, Scotch Plains, N.J., assignor to Merck & Co., Inc., Rahway, N.J., a corporation of New Jersey
No Drawing. Filed Sept. 9, 1960, Ser. No. 54,850
7 Claims. (Cl. 99—159)

This invention relates to an improved method of curing meat, and more particularly, to an economical method for accelerating the curing of meat and to compositions useful in meat curing.

Originally, one of the main purposes of curing meat was to preserve the meat without refrigeration. The so-called curing process consisted essentially of the addition of salt. Later it was found that by the addition of various agents the flavor and color of the meat could be substantially enhanced. It was also found that the use of other agents, notably ascorbic acid, its isomers and salts accelerated and stabilized the curing of meat so that the time involved in the curing process could be substantially reduced, resulting in faster and more carefully controlled curing cycles.

In the processing of meat today it is now a common practice to employ curing salt compositions which include sodium chloride, an alkali metal nitrite and/or nitrate along with ascorbic or isoascorbic acid. If desired, sugar in the form of cane, beet, or corn sugar may also be added to the medium, which in addition to enhancing the flavor is also of importance in producing a desirable curing medium. Phosphate in the form of sodium tripolyphosphate, sodium metaphosphate and trisodiumphosphate may also be added to the curing medium in varying amounts in accordance with methods previously described in the prior art. Other agents such as spices and various seasonings are also commonly employed in the curing process. In general, therefore, it might be said that ordinarily the main ingredients employed in the curing of meat are sodium nitrate, sodium nitrite, sugar and ascorbic acid or an isomer, salt or ester thereof.

It will be observed from the foregoing that, of the principal additives employed in the curing of meat, ascorbic acid or one of its isomers is the most expensive of the ingredients utilized.

It is, therefore, an object of this invention to provide a medium for the curing of meat which is substantially reduced in cost when compared with the presently employed salt ascorbate mediums. It is a further object to provide such a low cost medium which, however, will function in such a way that a rapid and carefully controlled curing reaction may be effected.

In accordance with one embodiment of my invention it has been found that it is possible to effect a rapid and carefully controlled cure of meat by employing a curing medium which, in addition to nitric oxide, includes as one of the ingredients an enolizable α-hydroxy carbonyl compound, i.e., one which will undergo a tautomeric shift under the conditions of the meat curing reaction to produce a compound which contains an ene diol group, i.e.,

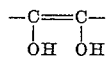

such as 2-keto gluconic acid, 2-keto gulonic acid, salts and esters of such compounds as well as other α-hydroxy carbonyl compounds which will enolize to ened diol compounds under the conditions of the meat curing reaction.

These α-hydroxy carbonyl compounds are all valuable in carrying out the rapid curing of meat. One of the members of this class, i.e., methyl-2-keto gluconate is especially advantageous for this purpose since a major portion of this particular compound enolizes under the conditions of the meat curing reaction. Thus, the curing medium produced by forming a mixture of salt, sodium nitrite and methyl-2-keto gluconate with the meat effects a rapid, economical and carefully controlled cure.

In accordance with a further emodiment of my invention it has been found that the above-mentioned α-hydroxy carbonyl compounds can be employed with particular advantage as a component of a so-called "pickle," i.e., a water solution of salt, sodium nitrite and other curing agents. In such a method it is desirable to maintain the pH of the pickling medium between about 5 and about 8.5 in order that the curing reaction will take place more readily and more efficiently.

This medium is particularly desirable for the curing of primal cuts of meat such as hams, chops and the like. The meat to be cured may be allowed to soak in the pickle solution or if a more rapid cure is desired the pickling solution may be injected into the meat to permit a more rapid diffusion of the curing agent throughout the tissue.

Pursuant to a still further method of carrying out the processes of my invention, comminuted meat of the type used in preparing frankfurters is mixed with a curing salt mixture containing sodium chloride, sodium nitrite and tripolyphosphate to which is added an enolizable α-hydroxy carbonyl compound.

The amounts of various salts and additives which comprise the curing mixture should be so adjusted that an aqueous extract of the curing mixture has a pH of from about 5 to about 8.5.

The curing mixtures utilized in the process of my invention may be conveniently employed in the preparation of other types of special meat products. For example, pork bellies may be cured for bacon by the use of a dry salt mixture containing methyl keto gluconate. In addition, various cured meat products which may be produced in accordance with the present invention are frankfurters, Vienna sausage, Bologna, cured meat loaves, chopped ham and the like.

In addition to the accelerated curing action obtained by employing one of the enolizable α-hydroxy carbonyl compounds other advantages are gained by the use of such materials. Outstanding among these is the reduced cost of curing medium as compared with the prior art ascorbate-nitrite curing mediums.

In accordance with my invention I have found that these enolizable α-hydroxy carbonyl compounds can be added to other curing agents in an amount which is dependent on the method of cure used, the material which is being cured, and the acceleration of cure or cure desired. The amount of enolizable α-hydroxy carbonyl compound which is added to the curing mixture varies with the compound and with the relative completeness of the enolization reaction. The exact amount must be determined experimentally and is dependent on the particular α-hydroxy carbonyl compound as well as the specific curing medium selected. For example, it has been found that adding methyl keto gluconate in amounts ranging from about 0.015% to about 0.075% based on the weight of the meat is satisfactory. Amounts in excess of 0.075% can be used if desired but it is desirable to employ at least 0.015% of the α-hydroxy carbonyl compound based on the weight of the meat.

While in general, an α-hydroxy carbonyl compound which will enolize under the conditions of the meat curing reaction may be employed in the process of my invention, for practical purposes it is desirable to select the compound which will effect the most rapid cure using the particular curing conditions and materials desired. To determine whether a particular α-hydroxy carbonyl compound is satisfactory for carrying out the process of my invention, the following test is performed: A selected sample of meat is ground with the curing mixture to be tested. Afer grinding the treated meat is stored with air excluded at a temperature of approximately 73° C. A control sample having no α-hydroxy carbonyl compound added is similarly treated. Samples of the meat are withdrawn at periodic intervals and visually compared with the control sample to determine the extent of development of cure color. Curing mixtures which produce a desirable pink color in a relatively short time are selected.

The examples which follow are merely intended to be illustrative of some of the specific embodiments of my invention, the limits of which are defined in the appended claims.

EXAMPLE I
*Curing of Chopped Meat With Methyl-Keto-Gluconate*

Chopped meat of the type used in sausage preparation, that is, three parts by weight of beef chuck, and two parts by weight of pork were ground and mixed together with sodium chloride and sodium nitrite and sodium hexametaphosphate, Curafos. This mixture was divided into one pound samples and mixed with varying amounts of methyl-keto-gluconate as indicated in the following table. After treatment with methyl-keto-gluconate, each of the samples was packed into 150 ml. beakers which were then covered with aluminum foil to exclude air and immersed in a constant temperature water bath set at 73° C. Samples of the meat were withdrawn periodically to observe cure color formation. The results are shown below.

| Sample | Percent of curing agents (by weight of meat) | | | | Cure color—Relative intensity | | | |
|---|---|---|---|---|---|---|---|---|
| | NaCl | NaNO2 | Sodium hexametaphosphate "Curafos" | MKG[1] | 5 min. | 10 min. | 15 min. | 25 min. |
| 1 | 2.5 | 0.015 | 0.5 | 0.00 | Trace | +1 | +2½ | +2½ |
| 2 | 2.5 | 0.015 | 0.5 | 0.15 | Trace | +1½ | +6 | +14 |
| 3 | 2.5 | 0.015 | 0.5 | 0.50 | Trace | +4 | +12 | +14 |

[1] MKG=Methyl-Keto-Gluconate.

The results of these rapid cure tests show that methyl-keto-gluconate increased the rate of cure of the samples of chopped meat. These tests indicate the relative rate of cure of sausage with and without methyl-keto-gluconate.

EXAMPLE II
*Curing of Chopped Meat Using Methyl-Keto-Gluconate Plus Phosphate*

In the same manner as described in the previous example, a beef pork mixture in the proportion of three parts of beef by weight to two parts of pork by weight was mixed with sodium chloride and sodium nitrite in the specified proportions. The chopped meat was divided into samples and the indicated amounts of sodium hexametaphosphate and/or methyl-keto-gluconate were added to the samples. The samples were then packed into 150 ml. beakers (6 beakers per sample). The samples were covered with aluminum and immersed in a water bath at 73° C. to determine the rate of development of cure color. The results are shown below.

| Sample | Percent of curing agent (by weight of meat) | | | | Cure color—Relative intensity | | | | |
|---|---|---|---|---|---|---|---|---|---|
| | NaCl | NaNO2 | Sodium hexametaphosphate "Curafos" | MKG[1] | 5 min. | 15 min. | 25 min. | 35 min. | 55 min. |
| 1 | 2.5 | 0.015 | 0.0 | 0.00 | 0 | Trace | +1 | +5 | +12 |
| 2 | 2.5 | 0.015 | 0.0 | 0.15 | Trace | +3 | +12 | +12 | +12 |
| 3 | 2.5 | 0.015 | 0.5 | 0.15 | 0 | +1½ | +11 | +11 | +12 |
| 4 | 2.5 | 0.015 | 0.0 | 0.075 | Trace | +2 | +10 | +11 | +12 |

[1] MKG=Methyl-Keto-Gluconate.

From the results of these tests it is evident that no phosphate is required for the effective use of methyl-keto-gluconate as a curing adjunct in meat.

EXAMPLE III
*Curing of Chopped Meat Using Ethyl-Keto-Gluconate*

In the manner described in the preceding example, a chopped beef pork mixture in the proportion of three parts by weight of beef to two parts by weight of pork was mixed with sodium chloride and sodium nitrite in the specified proportions. The mixture was divided into one pound samples which were then mixed individually with the indicated amounts of methyl-keto-gluconate and ethyl-keto-gluconate. The one pound samples were packed into 150 ml. beakers (5 beakers per treatment), the beakers covered with aluminum foil and immersed in a water bath at 73° C. to determine the rate of development of cure color. The samples were withdrawn periodically to observe cure color development. The results are shown below.

| Sample | Percent of curing agent (by weight of meat) | | | | Cure color—Relative intensity | | | | | |
|---|---|---|---|---|---|---|---|---|---|---|
| | NaCl | NaNO2 | MKG[1] | EKG[2] | 10 min. | 15 min. | 25 min. | 35 min. | 45 min. | 55 min. |
| 1 | 2.5 | 0.015 | 0.000 | 0.000 | 0 | Trace | +1½ | +4 | +8 | +10 |
| 2 | 2.5 | 0.015 | 0.075 | 0.000 | +½ | +1½ | +6 | +9 | +10 | +10 |
| 3 | 2.5 | 0.015 | 0.000 | .080 | Trace | +1 | +4 | +7 | +10 | +10 |

[1] MKG=Methyl-Keto-Gluconate.
[2] EKG=Ethyl-Keto-Gluconate.

It is evident from the results obtained that ethyl-ketogluconate functions effectively as an agent which accelerates the cure of chopped meat.

EXAMPLE IV

*Commercial Curing of Bologna Using Methyl-2-Keto-D-Gluconate*

Approximately 60 pounds of lean beef were cut into ¼ to ½ pound chunks and thoroughly mixed with 1.5 pounds of sodium chloride and 2.4 ounces of a commercially available curing salt known as Griffiths Prague Powder. This curing salt contains approximately 6.25% sodium chloride plus a mixture of sodium nitrite and sodium nitrate. The meat-salt mixture was maintained for four days at a temperature of 1-5° C. Following this holding period, the meat-salt mixture was chopped with approximately 45 pounds of ice.

Two twenty-five pound samples of the beef-ice mixture were then taken to determine the effect of the addition of methyl-2-keto-D-gluconate. The twenty-five pound samples were then treated according to the following procedure: to each of the twenty-five pound samples was added 15 pounds of pork trimmings, 4 pounds of an ice-water mixture, ¼ pound of fresh onion and 3.5 ounces of a commercially available seasoning agent (First Spices Bologna Seasoning) and chopping continued until the meat emulsion was uniform. To one of the samples, 13.61 gms. of methyl-2-keto-D-gluconate in 250 ml. of water was added approximately five minutes before chopping was completed. The resulting meat emulsion samples weighed approximately 45 pounds and the temperature of the emulsion was approximately 15-80° C. The control sample (no added methyl-2-keto-D-gluconate) and the test sample (added methyl-2-keto-D-gluconate) of meat emulsion were then stuffed in commercial sausage casings and the resulting stuffed sausage stored at 3-4° C. overnight (approximately 18 to 20 hours). The sausage was then allowed to warm gradually over a period of about 2 hours to a temperature of 15° C.

The sausage was then placed in a smoke house and smoked for 2.5 hours during which time the temperature of the smoke house, as measured at the top, was maintained at approximately 67-70° C. for the first hour then raised to approximately 82° C. for the last hour. During this time the internal temperature of the Bologna sausage increased from 15° C. to about 47° C.

The resulting smoked Bologna sausage was then cooked by immersing in hot water (72-75° C.) for approximately 1 hour and 15 minutes. The internal temperature of the sausage was 70-73° C.

The color stability of the smoked Bologna sausage was tested in the following manner. Samples of the sausage were sliced and wrapped in Saran-Wrap. The sliced samples were then exposed under Delux Daylight fluorescent light (60 foot candles) and visually observed for color changes. After 5½ hours exposure the control sample had faded to an unpleasant brown color while the methyl-2-keto-D-gluconate treated sample had maintained the original pink cure color. The relative intensity of cure color as determined by visual observation is recorded below.

| | Relative intensity of cure color |
|---|---|
| Control (no methyl-2-keto-D-gluconate) | +1 |
| Test sample (methyl-2-keto-D-gluconate added) | +4 |

I claim:
1. A method of curing meat to accelerate the rate of curing obtained with a nitric-oxide producing curing medium, which comprises contacting the meat along with the curing medium with at least 0.015% of a compound selected from the group consisting of an acidic α-hydroxy carbonyl compound and its salts and esters based on the weight of the meat, said acidic α-hydroxy carbonyl compound, salts and esters thereof, having the property of rearranging to form an acidic water soluble enediol compound at a pH of about 5 to 8.5.

2. A method of curing meat to accelerate the rate of curing obtained with a nitric-oxide producing curing medium, which comprises contacting the meat along with the curing medium with at least 0.015% of an acidic α-hydroxy carbonyl compound selected from the group consisting of 2-keto gluconic acid, 2-keto gulonic acid, and salts and lower alkyl esters thereof based on the weight of the meat at a pH of from about 5 to 8.5.

3. A method of curing meat to accelerate the rate of curing obtained with a nitric-oxide producing curing medium which comprises contacting the meat along with the curing medium with an amount of a lower alkyl ester of 2-keto gluconic acid ranging from about 0.015% to about 0.075% based on the weight of the meat at a pH of from about 5 to about 8.5.

4. A method of curing meat to accelerate the rate of curing obtained with a nitric-oxide producing curing medium which comprises contacting the meat along with the curing medium with an amount of methyl-2-keto gluconate ranging from about 0.015% to about 0.075% based on the weight of the meat at a pH of from about 5 to about 8.5.

5. A method of curing meat to accelerate the rate of curing obtained with a nitric-oxide producing curing medium which comprises contacting the meat along with the curing medium with an amount of ethyl-2-keto gluconate ranging from about 0.015% to about 0.075% based on the weight of the meat at a pH of from about 5 to about 8.5.

6. A method of curing meat to accelerate the rate of curing in the presence of a nitrite providing curing medium which comprises incorporating in the meat to be cured at least 0.015% based on the weight of the meat, of an acidic α-hydroxy carbonyl compound selected from the group consisting of 2-keto gluconic acid, 2-keto gulonic acid, salts and lower alkyl esters thereof at a pH of from about 5 to about 8.5.

7. A method of curing comminuted meat to accelerate the rate of curing in the presence of a nitrite providing curing medium which comprises incorporating in the meat to be cured from about 0.015% to about 0.075% of methyl-2-keto-gluconate based on the weight of the meat at a pH of from about 5 to about 8.5.

References Cited in the file of this patent

UNITED STATES PATENTS

| 2,627,473 | Brissey | Feb. 3, 1953 |
| 2,739,899 | Hollenbeck | Mar. 27, 1956 |
| 2,902,369 | Komarik | Sept. 1, 1959 |